(12) United States Patent
She et al.

(10) Patent No.: US 9,910,500 B2
(45) Date of Patent: Mar. 6, 2018

(54) SMART SIGNAGE SYSTEM

(71) Applicant: Pei Man James She, Hong Kong (HK)

(72) Inventors: Pei Man James She, Hong Kong (HK); Jon Crowcroft, Hong Kong (HK)

(73) Assignee: Pei Man James SHE, Hong Kong (HK)

( * ) Notice: Subject to any disclaimer, the term of this patent is extended or adjusted under 35 U.S.C. 154(b) by 456 days.

(21) Appl. No.: 13/762,410

(22) Filed: Feb. 8, 2013

(65) Prior Publication Data

US 2014/0062857 A1    Mar. 6, 2014

Related U.S. Application Data

(60) Provisional application No. 61/598,851, filed on Feb. 14, 2012.

(51) Int. Cl.

| G06F 3/01   | (2006.01) |
| G06F 3/0486 | (2013.01) |
| G06F 1/16   | (2006.01) |
| G06F 3/0487 | (2013.01) |
| H04W 4/00   | (2018.01) |
| H04M 1/725  | (2006.01) |

(52) U.S. Cl.
CPC ............ *G06F 3/017* (2013.01); *G06F 1/1694* (2013.01); *G06F 3/0486* (2013.01); *G06F 3/0487* (2013.01); *H04M 1/7253* (2013.01); *H04W 4/00* (2013.01)

(58) Field of Classification Search
CPC ...... G06F 1/1694; G06F 3/017; G06F 3/0487; G06F 1/1626; G06F 3/0486; H04W 4/02; H04W 4/00; G06Q 10/0637; G06Q 10/1093; H04M 1/7253

See application file for complete search history.

(56) References Cited

U.S. PATENT DOCUMENTS

| 6,622,173 B1 * | 9/2003 | Luke | ..................... H04L 1/1809 709/224 |
| 8,253,684 B1 * | 8/2012 | Lloyd | ..................... G06F 3/017 345/156 |
| 2001/0054066 A1 * | 12/2001 | Spitzer | ..................... H04L 29/06 709/203 |

(Continued)

FOREIGN PATENT DOCUMENTS

| CN | 201302803  | 9/2009 |
| WO | 2011094387 | 8/2011 |

OTHER PUBLICATIONS

International Search Report of PCT/CN2013/071587.
Search Report of counterpart European Patent Application No. 13154670.7 dated Aug. 5, 2013.

*Primary Examiner* — Richard Hong

(57) ABSTRACT

The present patent application is directed to a smart signage system. In one aspect, the smart signage system includes at least a signage device; at least a signage display being connected to the at least one signage device and configured to display contents stored in the signage device; and a plurality of client devices being in wireless communication with the at least one signage device. Each client device is configured to recognize a gesture from a user in correspondence with a target content displayed on the signage display, and thereby to acquire a file of information associated with the target content from the signage device.

10 Claims, 16 Drawing Sheets

(56) References Cited

U.S. PATENT DOCUMENTS

| | | | |
|---|---|---|---|
| 2002/0077896 A1* | 6/2002 | Liu | G06Q 10/0637 |
| | | | 705/14.61 |
| 2008/0285578 A1* | 11/2008 | DeLay | G06F 9/546 |
| | | | 370/412 |
| 2010/0083191 A1* | 4/2010 | Marshall | G06F 1/1626 |
| | | | 715/863 |
| 2010/0293024 A1* | 11/2010 | Feng | G06Q 10/1093 |
| | | | 705/7.18 |
| 2011/0010676 A1* | 1/2011 | Khosravy | G01C 21/3605 |
| | | | 715/863 |
| 2011/0175822 A1 | 7/2011 | Poon et al. | |
| 2012/0001722 A1* | 1/2012 | Jaiswal | G06F 1/1626 |
| | | | 340/3.1 |
| 2013/0033418 A1* | 2/2013 | Bevilacqua | G06F 3/017 |
| | | | 345/156 |
| 2013/0165151 A1* | 6/2013 | Gits | H04W 4/023 |
| | | | 455/456.3 |

\* cited by examiner

SMART SIGNAGE SYSTEM

CROSS-REFERENCE TO RELATED APPLICATIONS

This application claims the benefit of U.S. Provisional Patent Application No. 61/598,851 filed on Feb. 14, 2012, the contents of which is hereby incorporated by reference.

FIELD OF THE PATENT APPLICATION

The present patent application generally relates to human-computer interaction technologies and more specifically to a smart signage system that provides means for multiple users to concurrently and wirelessly interact and obtain interested information from any digital or non-digital displays even when the users or the displays are moving. One or multiple such systems can be situated for interactions, either at an indoor or outdoor location, in any transportation vehicle, on a mobile device, or even on any physical structure or surface.

BACKGROUND

The use of traditional static signages has been positioned as a general approach of providing broadcast information to a larger number of targeted audiences who pass by signages located at public or semi-public areas by chances.

Tear-off advertisements are commonly used in the past with creative designs, which allow individuals to physically tear off parts of a sign for collecting and keeping some specific information (e.g., contact information) of the advertised messages for follow-up actions.

Digital signages, as the replacement of traditional static signage and tear-off advertisements in public areas, have gained increasing popularity, especially for digital-out-of-home advertising. The pervasiveness of the smartphones makes it possible to implement interactive signage systems for more effective advertising. It is further desired to provide a signage system to interact with multiple users simultaneously in a scalable way at flexible distances, and to allow users to acquire advertised information through an intuitive means like the conventional tear-off signs even when the users are on-the-move.

SUMMARY

The present patent application is directed to a smart signage system. In one aspect, the smart signage system includes at least a signage device; at least a signage display being connected to the at least one signage device and configured to display contents stored in the signage device; and a plurality of client devices being in wireless communication with the at least one signage device. Each client device is configured to recognize a gesture from a user in correspondence with a target content displayed on the signage display, and thereby to acquire a file of information associated with the target content from the signage device.

The smart signage system may further include a wireless access point being wirelessly connected with the signage device and the client devices. The client devices may be in wireless communication with the signage device through the wireless access point. The wireless access point may be built in the signage device or the signage display.

The signage device may be configured to check content change from a content provider and update the contents stored in the signage device accordingly.

The signage device may be configured to join a broadcasting or multicasting group, to indicate the content currently being displayed on the signage display, and to provide content data associated with the target content to be transmitted together to the client devices through a predetermined broadcast/multicast scheduling policy.

The signage device may be configured to generate a plurality of packets for transmission and to transmit the packets to the client devices through broadcasting or multicasting. Each packet may include an ID of the content displayed on the signage display, data fragments of files corresponding to the same or other contents displayed on the signage display, and additional information about the signage display.

Each client device may be configured to join the broadcasting or multicasting group and to detect the gesture from the user. Each client device may be configured to receive packets transmitted from the signage device, to locally buffer the file of the corresponding content displayed on the signage display, and to open the file so as to display the corresponding interacted content of the signage display. The signage device and the client device may be configured to join the broadcasting or multicasting group asynchronously. The target content may be different from the content currently being displayed on the signage display.

The size of the file being opened by the client device may be smaller in size than a corresponding display file that the signage device opens to display the corresponding target content on the signage display.

The gesture may be a dragging action, and each client device may include a tri-axis accelerometer and be configured to detect the dragging action by checking the reading ranges of the tri-axis accelerometer when the total acceleration of the client device reaches a maximum.

The file may be divided into a plurality of data fragments. Once the client device has received all the data fragments of the file, the file may be kept in a temporary buffer of the client device as long as the client device is associated with the broadcasting or multicasting group.

Once the gesture is detected by the client device, the client device may be configured to inspect the data fragment of the received packet and identify the corresponding file of target content in the buffer. If the complete file is in the buffer, the client device may be configured to open the file and display the target content; otherwise, the client device may be configured to continue receiving data fragments of the file until all the data fragments of the file are successfully received.

The client device may be configured to buffer files associated with all the contents displayed on the signage display before the user performs any gesture for a particular target content. The client device may be configured to remove a buffered file if the content associated with the file is not selected by the user with the gesture and the client device has been placed out of an interaction range for a predetermined time period.

In another aspect, the smart signage system includes: a plurality of signage devices; a plurality of signage displays being connected to the signage devices and configured to display contents stored in the signage devices respectively; and a plurality of client devices being in wireless communication with the signage devices through a wireless router. Each signage display is disposed with a predetermined azimuth angle. Each client device includes an orientation sensor that measures an azimuth angle of the client device, and is configured to receive a gesture from a user in correspondence with a target content displayed on a selected signage display among the plurality of signage displays, and thereby to download a file associated with the target content from the signage device connected with the selected signage display. The azimuth angle of the client device is in a predetermined range of the azimuth angle of the selected signage display.

The gesture may be a dragging action. Each client device may include a tri-axis accelerometer and be configured to detect the dragging action by checking the reading ranges of the tri-axis accelerometer when the total acceleration of the client device reaches a maximum.

In yet another aspect, the smart signage system includes: at least a signage device; at least a signage display being connected to the at least one signage device and configured to display contents stored in the signage device; and a plurality of client devices being in wireless communication with the at least one signage device. Each client device is configured to choose a signage display to interact with based on the orientation of the client device and the orientation of the signage display, to receive a gesture from a user in correspondence with a target content displayed on the chosen signage display, and thereby to download a file associated with the target content from the signage device connected with the chosen signage display.

Each client device may include an orientation sensor that measures an azimuth angle of the client device. Each signage display may be disposed with a predetermined azimuth angle, and each client device may be configured to choose a signage display to interact with if the azimuth angle of the client device is in a predetermined range of the azimuth angle of the signage display.

BRIEF DESCRIPTIONS OF THE DRAWINGS

DETAILED DESCRIPTION

Reference will now be made in detail to a preferred embodiment of the smart signage system disclosed in the present patent application, examples of which are also provided in the following description. Exemplary embodiments of the smart signage system disclosed in the present patent application are described in detail, although it will be apparent to those skilled in the relevant art that some features that are not particularly important to an understanding of the smart signage system may not be shown for the sake of clarity.

Furthermore, it should be understood that the smart signage system disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
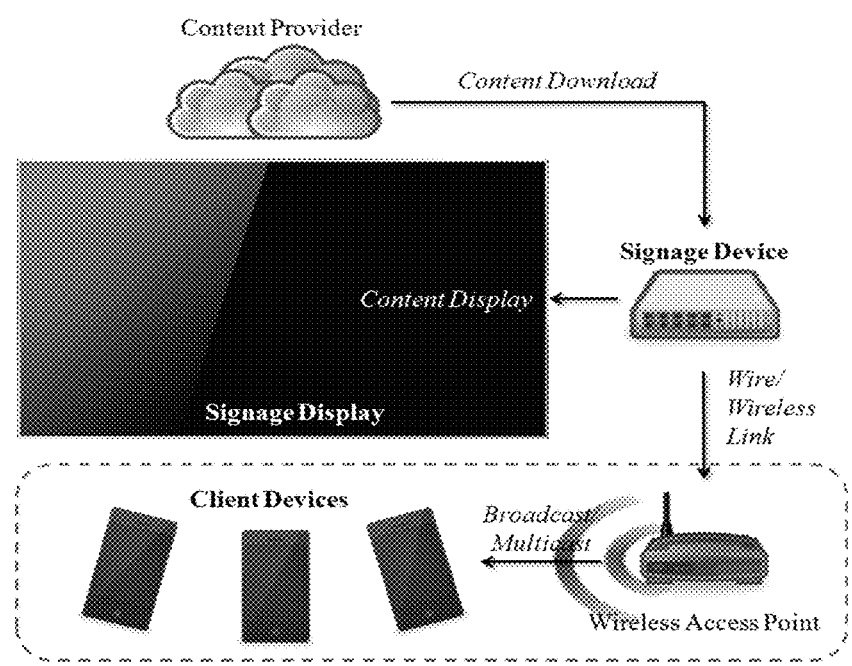
FIG. 1 illustrates the architecture of a smart signage system according to an embodiment of the present patent application.

FIG. 1 illustrates the architecture of a smart signage system according to an embodiment of the present patent application. Referring to FIG. 1, the smart signage system includes a signage display, a signage device and a plurality of client devices. The signage device is mounted with a wireless access point, which wirelessly connects to the client devices such as smartphones. The signage device and the client devices are the key components to be manipulated in order to achieve user experiences of good quality. The signage device is configured to communicate with a content provider via another interface for obtaining updated content. It is understood that the wireless access point may be built in and as a part of the signage device or the signage display.

There are mainly two parts of the smart signage system that establishes an intuitive interaction modality for scalable and simultaneous multi-user interactions and information collection. The first is on a software platform that associates the signage device and a group of client devices functioning as a broadcaster and the corresponding receiving mobile applications. An important aspect of the client device side is to enable the client device with some novel mechanisms to react to a dragging gesture for interaction and information collection that coordinate with a specially designed broadcast/multicast radio. The second is on a cyber-physical B/M (broadcast/multicast) protocol running on the developed software platform, which serves as the key to enable scalable multi-user interactions and information delivery for instant responses. Each of these three parts will be described in details hereafter.

Figure 2:
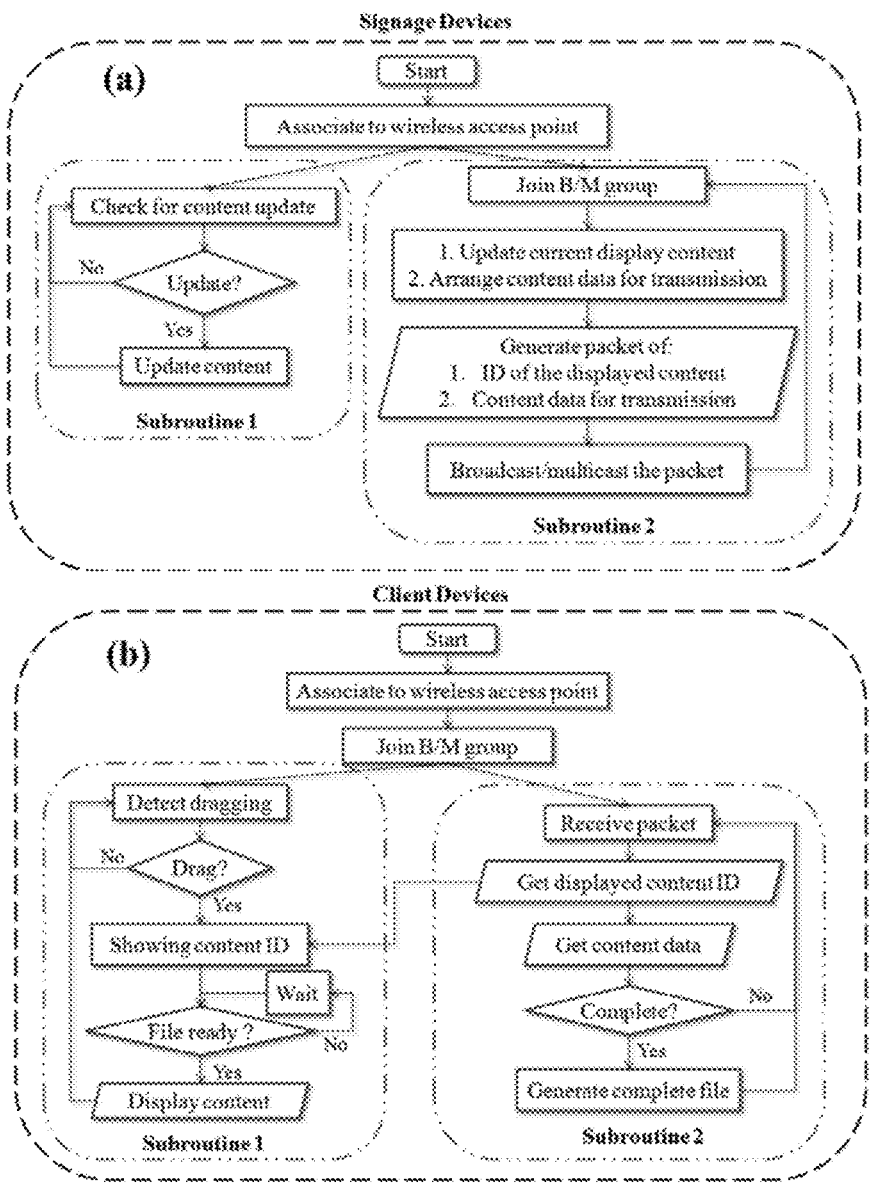
FIG. 2 shows flowcharts illustrating control and information flows of the software platform for the signage device and the client devices in the smart signage system depicted in FIG. 1.

FIG. 2 shows flowcharts illustrating control and information flows of the software platform for the signage device and the client devices in the smart signage system depicted in FIG. 1. For the signage device, once it starts running, it first associates itself with the wireless access point. Then it starts to constantly and periodically broadcast the draggable file divided into K segments. After that the program splits into two subroutines. As shown in FIG. 2-(*a*), the Subroutine 1 is responsible for checking content change from the content provider and possibly updating the content stored in the signage device accordingly. The Subroutine 2 handles the scenario that once joining the B/M group, the client devices continuously receive the B/M packets of draggable files broadcasted/multicasted from this subroutine. In the meanwhile this subroutine is also responsible for providing the information about the content currently displayed on the signage display. In summary, each B/M packet contains both the information of which content is being displayed on the signage at the moment, and also the draggable files of the corresponding content or other content. One thing to notice regarding the operation of the signage device is that, the content files (i.e., the display files), which are mainly images shown on the signage display and the files opened by the signage device to display the content on the signage display, are mostly different from its corresponding draggable files being B/M transmitted to the client devices. The size of draggable file is much smaller than display file as it only needs to fit into the small displays of the client devices.

Figure 3:
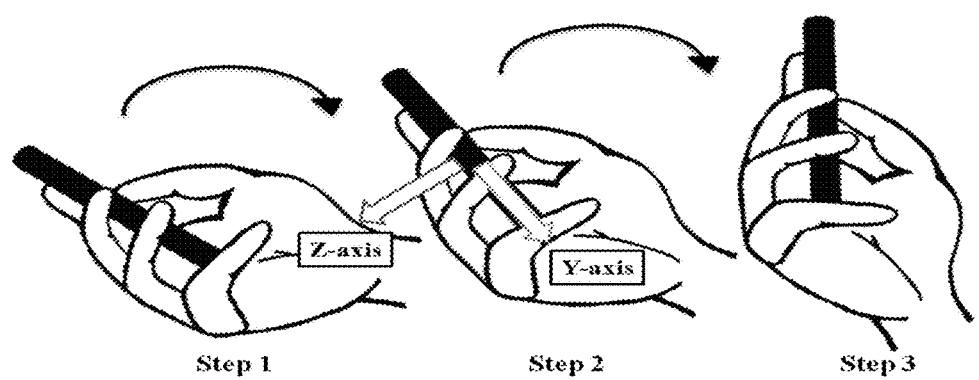
FIG. 3 is a diagram illustrating the dragging gesture that employed by the smart signage system depicted in FIG. 1.

For each of the client devices, it first associates itself with the wireless access point and then joins to the same B/M group as the signage device. After that, the program splits into two subroutines. The Subroutine 1 is responsible for detecting the dragging gesture and displaying the dragged content on the client device after a dragging is successfully detected. The Subroutine 2 as illustrated in FIG. 2(b) is responsible for receiving the packets broadcasted/multicasted from the signage device and locally buffering all the draggable files. Note that the client device only detects one gesture (usually a simple one) to recognize a single dragging event at a time as shown in FIG. 3 while a user is intending to collect a content displayed on the signage. Although conventional hand gesture recognition requires gesture spotting and gesture segmentation, the fact that only one simple gesture is used in the client devices of the smart signage system in this embodiment makes it possible to detect the dragging event by simply checking the ranges of the tri-axis accelerometer when total acceleration, $\overline{A}=\sqrt{A_x^2+A_y^2+A_z^2}$ (where $A_x$, $A_y$ and $A_z$ are the acceleration values in the x, y and z axes of the accelerometer respectively), reaches a maximum. The choice of a gesture and the detection method can be flexibility extended or replaced by a choice and a method other than the one mentioned here to achieve the user-initiated concurrent interactions with the signage.

Figure 4:
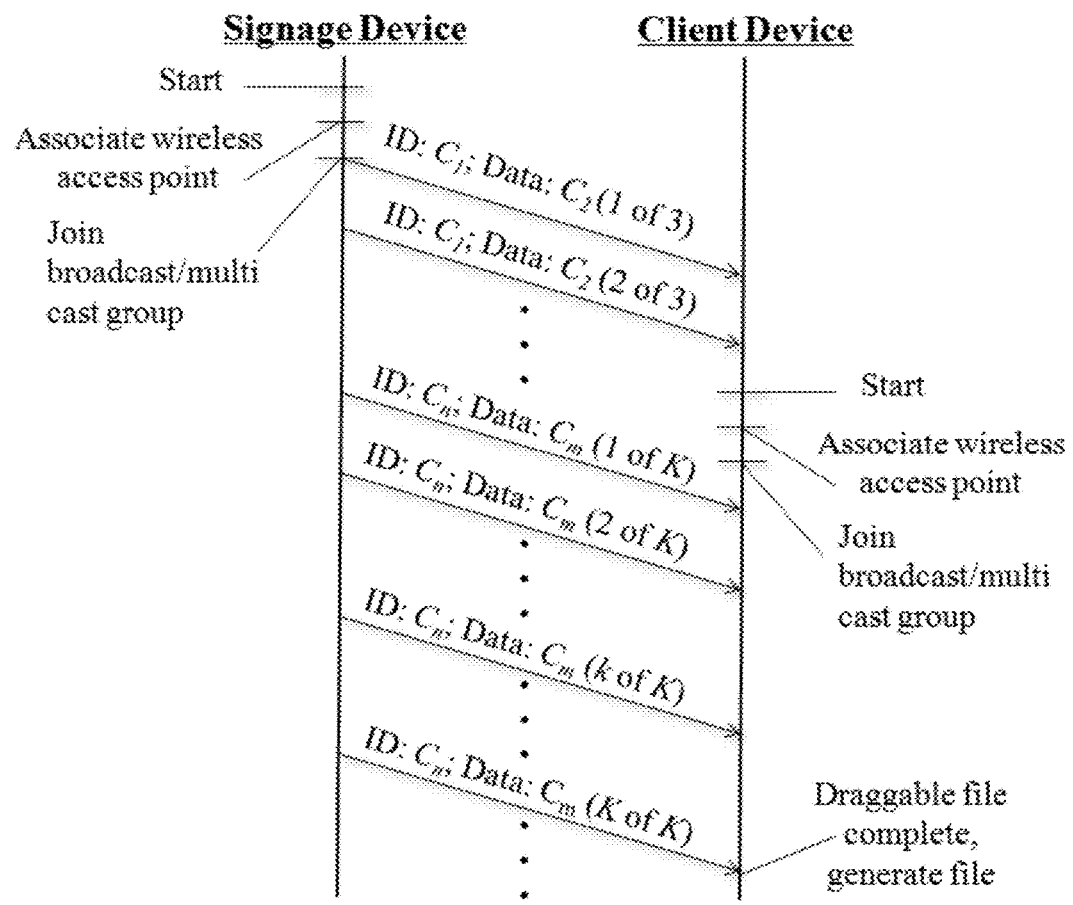
FIG. 4 shows a protocol-level sequence diagram of the smart signage system depicted in FIG. 1.

In terms of the B/M information delivery initiated by a user interaction, it is always a challenging requirement to make a user experience the shortest response time to acquire the desired information. Compared with some conventional B/M protocols, the protocol of the smart signage system in this embodiment has several special mechanisms that help the system achieve the shortest response time upon a dragging event. Since the client device can launch a dragging event at any time instant before the interaction with a signage device, the dragging event at the client device is equivalent to a request for a draggable file to the signage device in the broadcast network. The user experience will be at least subjected to the channel rate and file size of the targeted draggable file as well as the B/M cycle of draggable files being transmitted. FIG. 4 shows a protocol-level sequence diagram of the smart signage system depicted in FIG. 1. An important feature of the proposed design is that the signage device and the client device can start (and thereby join the B/M group) asynchronously. Their operations are described hereafter in more detail.

Referring to FIG. 4, the signage device may have been running for a while already and continuously broadcasting/multicasting data fragments (similar as IP multicast packets) of a "draggable" file belonging to some content. At any time instant, each B/M data fragment generated by the signage device strategically contains at least two types of information: 1) a display ID, named as $C_n$ ($1 \le n \le N$), to tell which content is being shown on the signage display at that time instant; 2) a data fragment k ($1 \le k \le K$) of content, $C_m$ ($1 \le m \le N$). Note that subject to certain scheduling policy, n is not necessarily equal to m since a packet may belong to a content which is different from the one being displayed on the signage. On the other hand, the total size of each content $C_m$ is not necessary to be the same and each content $C_m$ does not necessarily include a common constant K data fragments.

For the simplicity, the prototype has every draggable file of different content with the same size and divided into the same number of K data fragments. Thus a data fragment is only a part of draggable file $C_m$, which is indexed by k (where $k \le K$) to indicate its sequence for the client device.

The client device can start and join the same B/M group at any time to receive the B/M packets. Once the client device has received all the K data fragments of a draggable file of a content $C_m$, the client device can successfully obtain the complete draggable file, which is then kept in the temporary buffer of the client device as long as the client device is still associated with the B/M wireless interface (group). Once the dragging gesture is detected at the client device, the client device inspects the value of display ID, $C_n$, of the received B/M packet at that time instant and identify if the corresponding complete draggable file, $C_m$, in the buffer (where m=n) is ready or not. If a complete draggable file is ready, it will be displayed on the screen of the client device. Otherwise, it will continue receiving the remaining data fragments of $C_m$ (where m=n) until all the data fragments are successfully received. It is actually advantageous to buffer the draggable files of all the content at the client device before the user performs any dragging gesture for a particular content, $C_n$, which will give the best response experiences perceived by the user, as implemented in another embodiment. A draggable content in the buffer of a client device will be removed when it is not dragged by a user and the client device has already been placed out of the interaction range of the system for a while (e.g. for a predetermined time period).

A digital signage deployed in a real-world environment requires a speedy interaction with users. It is expected that the response delay should be in the level of 1 second or less, in order to address the situations wherein the users try to obtain a draggable file from a digital signage even when they are moving. For example, a very short response delay is required when the users are passing by the signage during the moment he/she is taking an escalator in a subway, walking through a hotspot area, or even on the move over a vehicle. Therefore, the user response delay is regarded as the most important performance metric toward the success of the aforementioned smart signage system, which will be formulated and the analyzed through comprehensive numerical evaluations hereafter.

Figure 5:
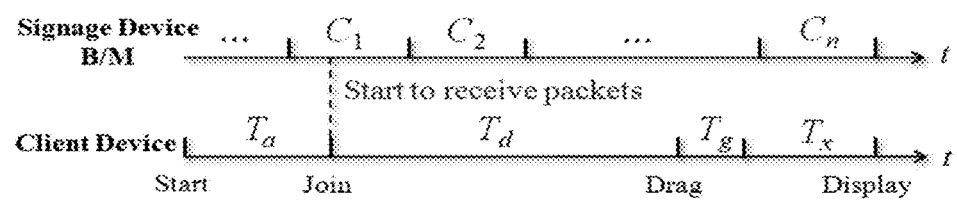
FIG. 5 shows the timing profiles of the signage device and the client device in the smart signage system depicted in FIG. 1.

FIG. 5 shows the timing profiles of the signage device and the client device in the smart signage system depicted in FIG. 1. The digital signage continues broadcasting the data fragments of each draggable file one after the other. The client device, on the other hand, goes through the association time $T_a$, which is the time interval between the moment when the client device starts and the moment when it has successfully joined the B/M group; the decision time $T_d$, which is the time interval between the moment when the user has successfully joined the B/M group and the moment when the user performs a dragging gesture; the gesture detection time $T_g$, which is the time period required for the client device to recognize the dragging gesture for a confirmed interaction and information acquiring; and the transmission time $T_x$, which is the time interval between the moment when a dragging gesture is confirmed and the moment the intended content is shown on the display of the client device.

As $T_a$ is determined by the hardware and system settings and $T_d$ is primarily determined by the user, they are not counted to the response time of the system from the user experience perspective. Thus the performance of the smart signage system is characterized by the time delay perceived by the user, which is denoted as $T_r$ and has the following expression:

$$T_r = T_g + T_x \qquad (1)$$

In Eq. (1), $T_g$ depends on the complexity of the gestures, which is small as only one simple gesture is used in this system; while $T_x$ depends on whether the dragging gesture is confirmed before or after a complete cycle of draggable files are buffered. In other words, if $T_a + T_d$ is larger than a broadcast cycle, then $T_x$ can most likely be the minimum since the desired draggable file should have been in the buffer. Obviously, the analysis on $T_g$ is rather simple, while that for $T_x$ is the most critical due to the human factor $T_d$.

Before starting to calculate the value of $T_x$, some assumptions need to be made to simplify the problem of performance analysis:

1) An ideal channel is assumed, which means there will be no packet loss;

2) Each draggable file has the same size uniformly divided into K fragments, and the time needed to send out one complete draggable file (i.e., file transfer time) is denoted as $T_f$;

3) The packets are B/M at the digital signage in a periodic manner as shown in FIG. 5. For example, if the displayed content is in the order of $C_1$, $C_2$, $C_3$, $C_1$ and so on, the signage will launch all the packets of $C_1$ before any packets of $C_2$ is launched, and so on;

4) Let $T_c = N \times T_f$ denote the time of one complete B/M cycle. Although the system can operate indefinitely, the analysis will only focus on one B/M cycle after the user has successfully joined the B/M group. The reason is that after one B/M cycle, all the draggable files would have been buffered in the client device provided with no packet loss, which means $T_x$ is always 0 afterwards;

5) Decision time that falls into the range of $0 \leq T_d < T_c$ will be considered as only one B/M cycle is interested;

6) The time point when the user has successfully joined the B/M group is random, which is uniformly distributed over the time of one complete B/M cycle.

Figure 6:
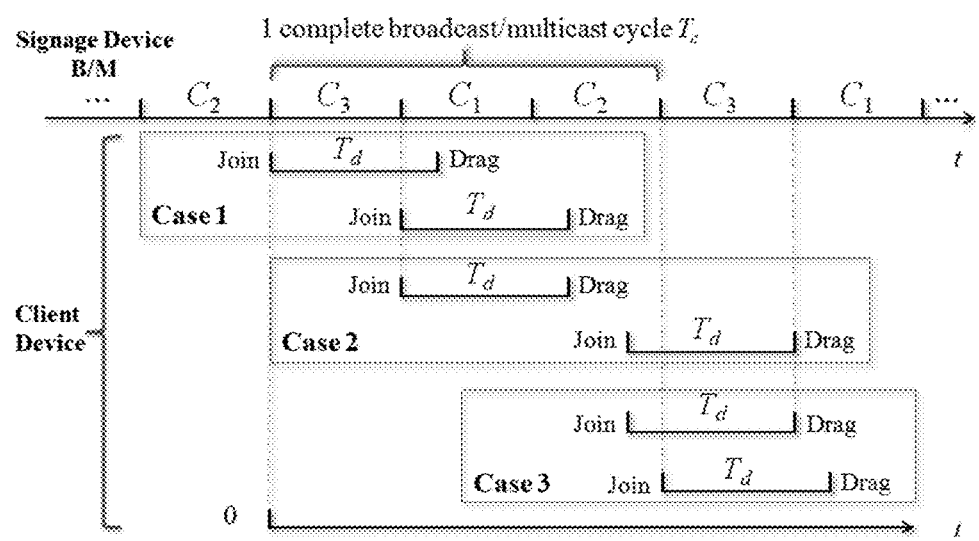
FIG. 6 is a diagram illustrating a simple example for evaluating $T_x$, where N=3 and $T_f < T_d < 2T_f$.

FIG. 6 is a diagram illustrating a simple example for evaluating $T_x$, where N=3 and $T_f < T_d < 2T_f$. Now the user is interested in $C_3$. To estimate $T_x$ required to receive the complete draggable file, $C_3$, by a client device, it is necessary to understand various cases of a time period, t, between the point when a complete B/M cycle starts to be counted and the moment when the client device has successfully joined the B/M group before a "drag" happens. Since a reliable channel is assumed for the simplicity, it is our interest to evaluate how one complete B/M cycle, $T_c$ may be experienced by a client device under these cases for dragging $C_3$, in the condition of $0 \leq t < T_c$.

Case 1 $0 \leq t < T_f$: as only part of all the packets of $C_3$ is received in this case, $T_g + T_x = T_c - T_d$;

Case 2 $T_f \leq t < T_c + T_f - T_d$: where the user has to wait until the packets of $C_3$ have been received, so $T_g + T_x = T_c - T_d - (t - T_f)$;

Case 3 $T_c + T_f - T_d \leq t < T_c$: as all the packets of $C_3$ have been received before the dragging, $T_x = 0$.

One thing to notice in this example is that although the user is interested in $C_3$, the results will be the same for other contents as one complete B/M cycle has been considered. As the gesture detection time $T_g$ is constant and small because of the simple implementation discussed before, in the following analysis we take $T_g = 0$ to further simplify the equations. In this case the transmission time $T_x$ can be expressed as:

$$T_x(t) = \begin{cases} T_c - T_d & \text{for } 0 \leq t < T_f \\ T_c + T_f - T_d - t & \text{for } T_f \leq t < T_c + T_f - T_d \\ 0 & \text{for } T_c + T_f - T_d \leq t < T_c \end{cases} \qquad (2)$$

Eq. (2) is also valid for all N>2 and $T_f \leq T_d < T_c$, which can be verified in a similar manner. In terms of N>2 and $0 \leq T_d \leq T_f$, $$T_x(t) = \begin{cases} T_c - T_d & \text{for } 0 \leq t < T_f \\ T_c + T_f - T_d - t & \text{for } T_f \leq t < T_c \end{cases} \qquad (3)$$

Eq. (2) and (3) are for the situation that N>2, however, sometimes there could be only one content on the signage display, which means N=1, hence the transmission time is $$T_x(t) = T_f - T_d \qquad (4)$$

As assumed earlier that the time point when the user has successfully joined the B/M group is uniformly distributed over one complete B/M cycle, taking expectation of $T_x$ with respect to t will give an expected transmission time $T_x$ experienced by the user:

$$\overline{T_x}(N, T_f, T_d) = \begin{cases} \left[(T_c - T_d)T_f + \frac{1}{2}(T_c - T_f)(T_c + T_f - 2T_d)\right]/T_c \\ \text{for } 0 \leq T_d < T_f \text{ and } N \geq 2 \\ \left[(T_c - T_d)T_f + \frac{1}{2}(T_c - T_d)^2\right]/T_c \\ \text{for } T_f \leq T_d < T_c \text{ and } N \geq 2 \\ T_f - T_d \\ \text{for } N = 1 \end{cases} \qquad (5)$$

Hence, the expected response time $T_r$:

$$\overline{T_r} = T_a + T_g + \overline{T_x} \qquad (6)$$

A summary of the parameters used in the above performance analysis is shown in Table 1.

TABLE 1

Summary of parameters used in the performance analysis

| Parameter | Remark |
| --- | --- |
| $T_r$ | Response time |
| $T_a$ | Association time |
| $T_g$ | Gesture detection time |
| $T_x$ | Transmission time |
| $T_d$ | Decision time |

TABLE 1-continued

Summary of parameters used in the performance analysis

| Parameter | Remark |
| --- | --- |
| $T_f$ | File transmission time |
| $T_c$ | Cycle time |
| t | Auxiliary time |
| $T_x$ | Expected transmission time |
| $T_r$ | Expected response time |

Eq. (5) above shows that $T_x$ is a function of N, $T_f$ and $T_d$. Note that $T_f = S_f/B$ where $S_f$ is the size of the draggable file and B is the bandwidth of the B/M media. So the expected response time of the system $T_r$ is a function of $T_g$, N, $S_f$, B and $T_d$. The fact $T_g$ is small in real implementation makes it not much meaningful to study the relation between $T_r$ and $T_g$. As the smart signage system only uses one simple gesture with a very simple detection algorithm, the client device can almost recognize the gesture instantaneously. Hence $T_g$ is fixed to be 0.01 s in the following numerical analysis, which is the same as in real implementation.

Figure 7:
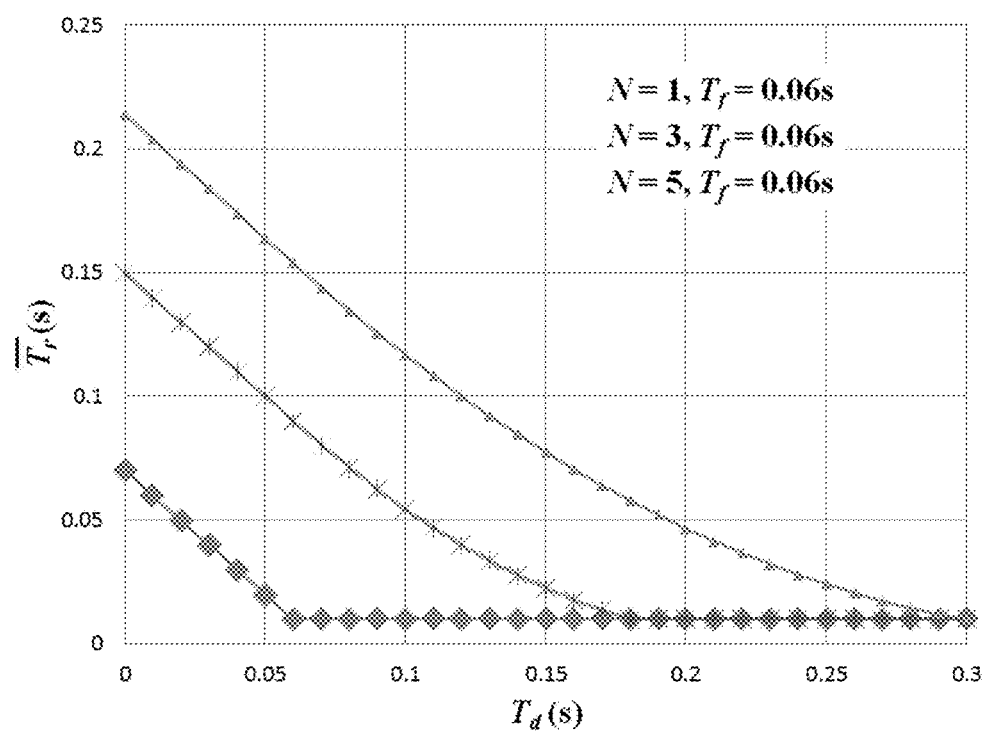
FIG. 7 shows the plot of $T_r$ against $T_d$.

FIG. 7 shows the plot of $T_r$ against $T_d$. Referring to FIG. 7, as a larger $T_d$ means a longer time for the client device to buffer the draggable files, the speculation is that $T_r$ will decrease as $T_d$ grows. $T_r$ is plotted against $T_d$ under the condition of N=1, 3 and 5. Note that $T_r = T_g$ after $T_d = T_c$, as basically all the draggable file have been buffered after $T_d = T_c$, so that the expected transmission time $T_x$ will be 0 s afterwards. $T_f$ is fixed at 0.06 s as the draggable file size $S_f$ is around 30 KB (for a 260×350 JPEG image) and the bandwidth B is around 4 Mbps (the performance of a wireless IEEE 802.11n local area network) in real implementations. The decision time $T_d$ required to achieve small $T_r$ is also small compared with the time required for the user to react to the smart signage system, which is relatively easy to achieve in the real situation. Therefore, the implication of the plot is that, when a user discovers a signage content that is interesting and reacts to the smart signage system by performing a dragging gesture, in most cases the user will only experience very small response delay before the content is display on the client device. Even for the worst case, the expected delay will be below 1 second.

Figure 8:
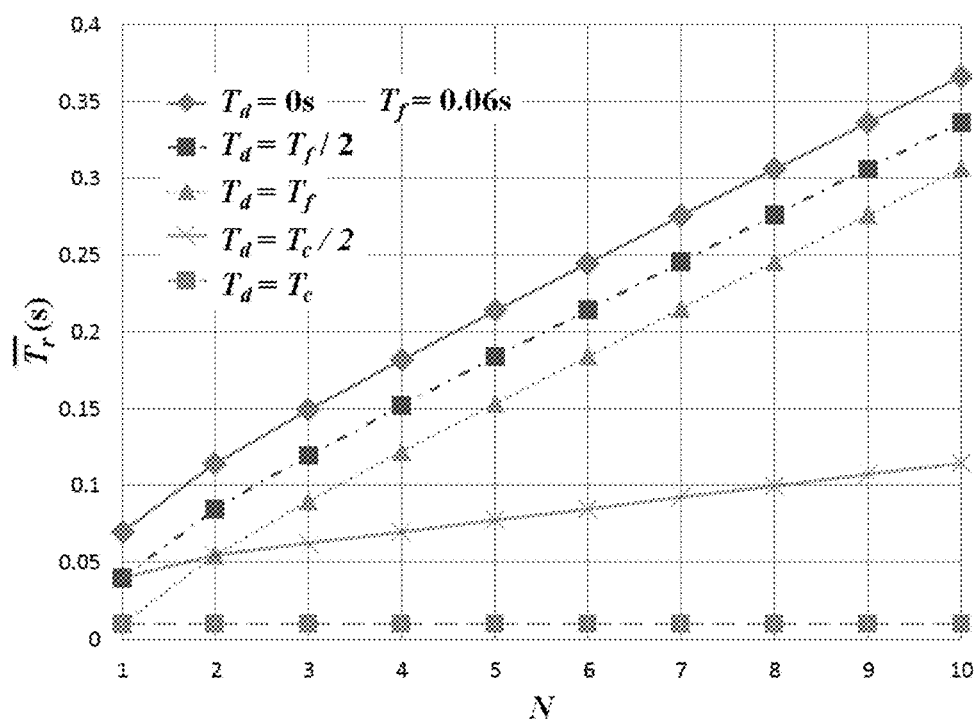
FIG. 8 is a plot illustrating the relationship between $T_r$ and N.

FIG. 8 is a plot illustrating the relationship between $T_r$ and N. A range of values of $T_d$ are used in this numerical analysis, which are $T_d=0$ s, $T_d=T_f/2$, $T_d=T_f$, $T_d=T_c/2$ and $T_d=T_c$. These are boundary and turning points as well as two representative points in Eq. (5) with respect to $T_d$ such that the boundaries of $T_r$ can be shown in the plot as well as some representative curves in between. $T_f$ is fixed at 0.06 s for the reason explained earlier. As can be observed from the plot, for each value of N from 1 to 10, the lower bound of $T_r$ is $T_g$, and the upper bound is approximately proportional to N. Overall, this system gives reasonable expected response time for this range of N. Putting large number of content in this system is not preferable, while N=5 is reasonable in real implementation. The reason is that insufficient content will not fully utilize the signage display and too much content will overwhelm the users by causing very long Tr. By choosing N=5, the implication is that the user can freely choose between as many as 5 different contents while still experiencing small lagging for dragging the interested content most of the time, the lagging being below 1 second in the worst-case scenario.

Figure 9:
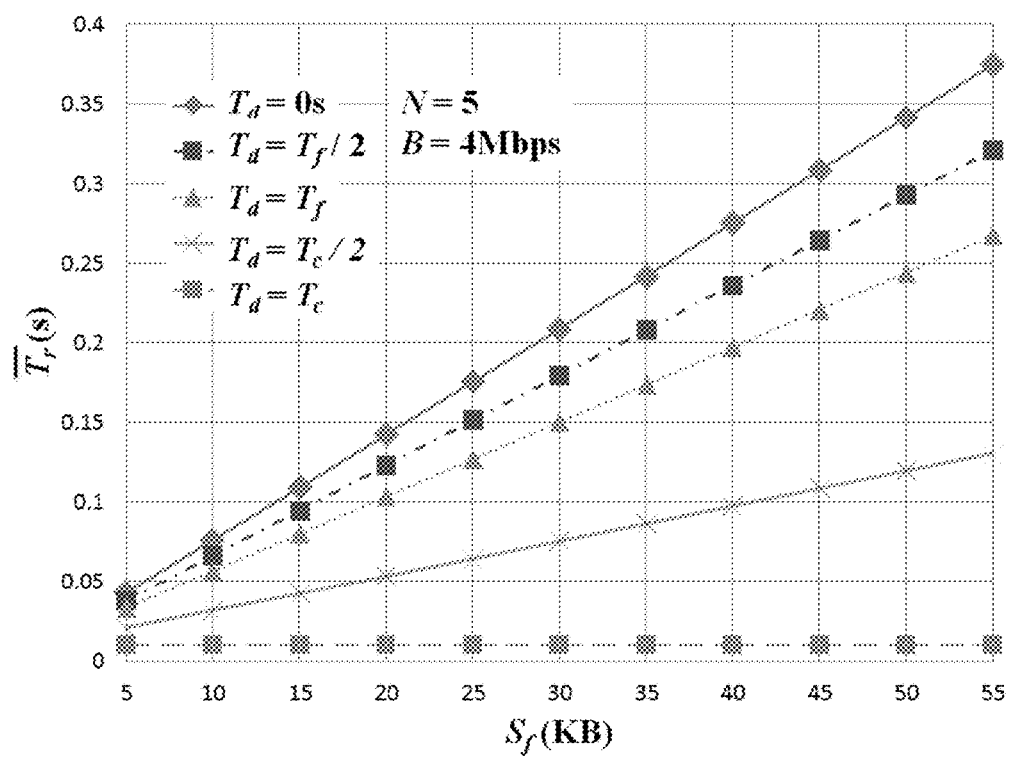
FIG. 9 is a plot illustrating the relationship between $T_r$ and $S_f$.

FIG. 9 is a plot illustrating the relationship between $T_r$ and $S_f$. The same values of $T_d$ used in FIG. 8 are used in this plot. N is fixed at 5 and B is fixed at 4 Mbps in this numerical analysis. As can be observed from the plot, for each value of $S_f$ from 5 KB to 55 KB, the lower bound of $T_r$ is $T_g$, and the upper bound is linear with $S_f$. Although $T_r$ for each $S_f$ is relatively small, it is not a good idea to use large $S_f$ from the perspective of small expected response time Tr. To look at this problem from another angle, it is actually not necessary to use large $S_f$ as the resolution of the client device display is limited.

The size of the draggable file cannot be reduced too much otherwise the user experience will be compromised. As a result, a JPEG image (could be in other image formats) that fits most of the resolutions of a client device display (i.e., 260×350 pixels of the JPEG image) is used for the draggable file, which is approximately 30 KB in size. This file size will allow the user to drag content of good quality while still experience fast responses for dragging the interested content most of the time, with the worst-case scenario below 1 second.

Figure 10:
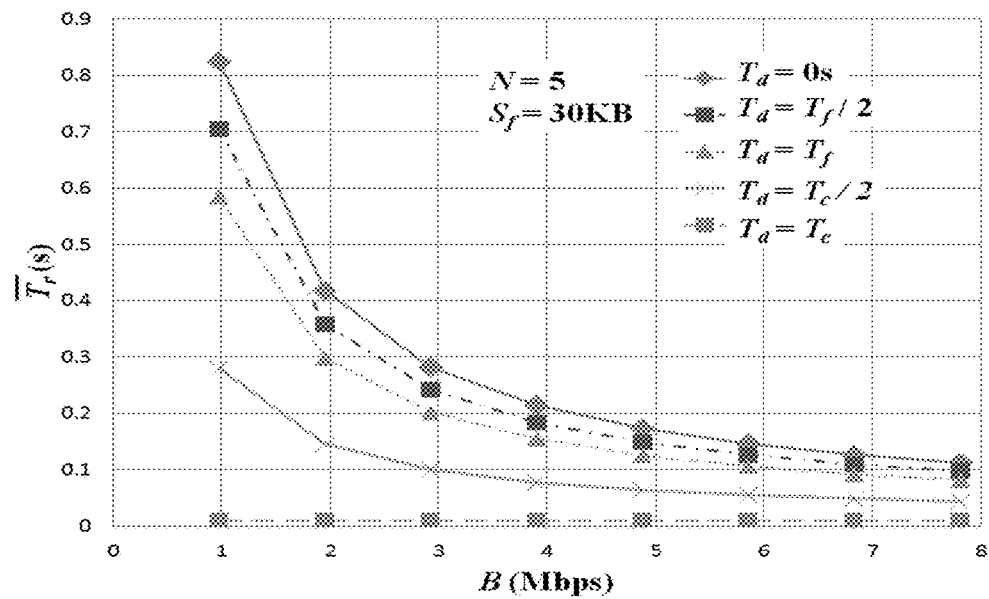
FIG. 10 is a plot illustrating the relationship between $T_r$ and B.

FIG. 10 is a plot illustrating the relationship between $T_r$ and B. The same values of $T_d$ used in FIG. 8 are used in this plot. N is fixed at 5 and $S_f$ is fixed at 30 KB for the reasons explained before. It can be observed from the plot that the lower bound of $T_r$ is $T_a$ and upper bound of $T_r$ is inverse proportional to B. Although further increasing B will even reduce $T_r$, the gain will keep diminishing as B becomes larger. Hence B=4 Mbps will be adequate in real implementation to achieve relatively small $T_r$. If we consider a non-ideal channel by taking effective bandwidth as B, FIG. 10 can also be interpreted as the case where a larger error probability leads to lower effective bandwidth and thus longer $T_r$. As can be observed from the plot, B=4 Mbps, which is approximately the effective LAN bandwidth of IEEE 802.11n standard, will be sufficient to achieve small $T_r$ in real implementation. So the implication is that by using conventional wireless transmission technology, it is possible to allow the user to experience small lagging for dragging the interested content most of the time, with the worst case scenario below 1 second.

Therefore, by carefully choosing the parameters within the implementable ranges learned from the performance analysis, it is possible to achieve a satisfying user experience most of or all the time, in terms of a small expected response time $T_r$ which is less than 1 second.

Figure 11:
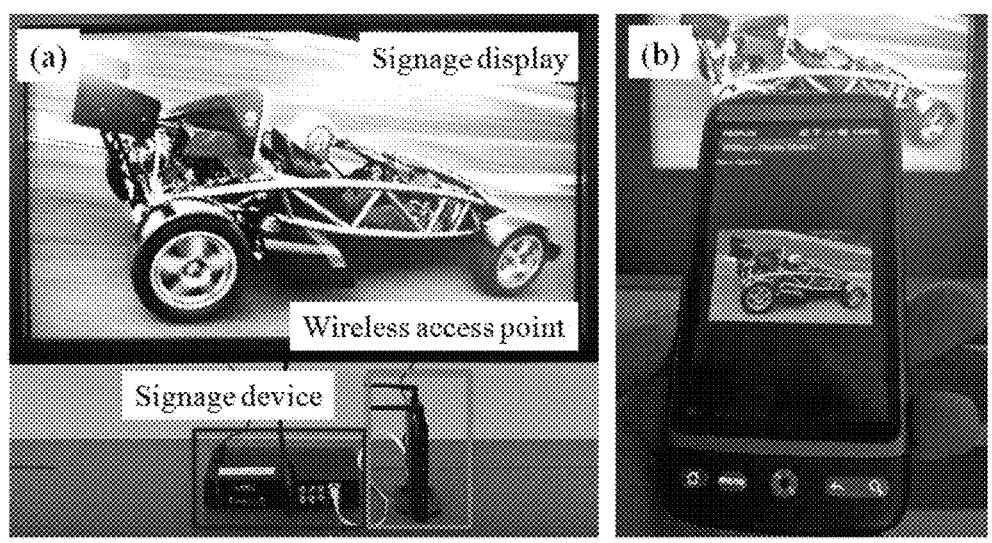
FIG. 11 illustrates an implementation of a cyber-physical draggable B/M media system for smart signage according to another embodiment of the present patent application.

FIG. 11 illustrates an implementation of a cyber-physical draggable B/M media system for smart signage according to another embodiment of the present patent application. Referring to FIG. 11, the system (a) includes a LCD TV as the signage display, a VxWorks-based embedded media playback system that implements the software designs and the protocol as the signage device, and an IP-multicast capable IEEE 802.11n (Wi-Fi) wireless router. The signage device has a HDMI connection to the LCD TV and a LAN connection to the wireless router. The wireless router is used by the signage device to B/M packets to client devices (b) such as smartphones that implement the protocol and software designs of gesture recognition. The client devices (b) may be Android-based and Apple iOS-based commercial smartphones.

Figure 12:
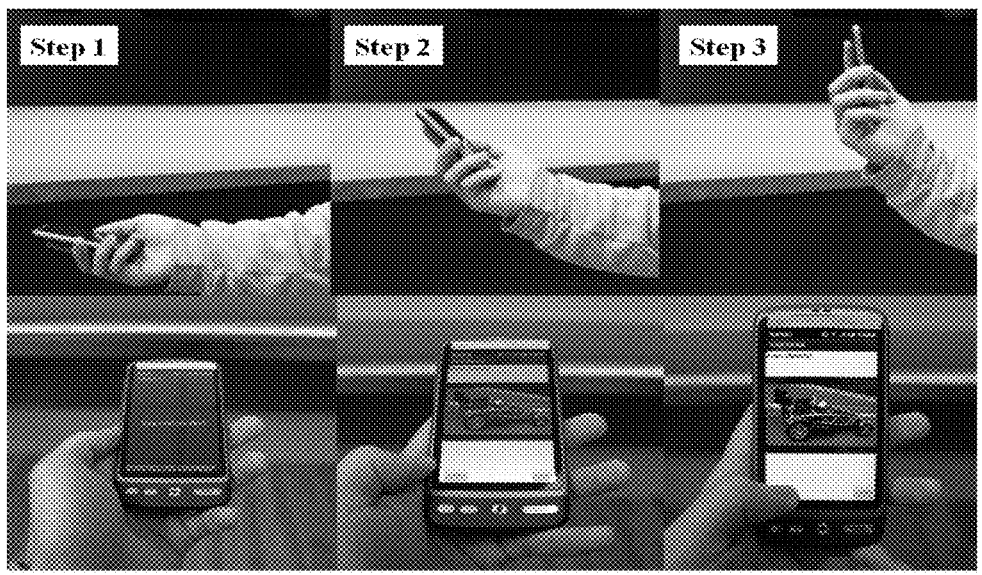
FIG. 12 shows the photographs that capture the three steps of a dragging gesture.

FIG. 12 shows the photographs that capture the three steps of a dragging gesture. A vertical levitation of the smartphone can be observed during the process. The client mobile application responses to the three steps accordingly.

Step 1: Before the user performs a dragging gesture, the display on the smartphone shows "Drag what you like";

Step 2: After the dragging gesture is detected, the intended content will be displayed on the smartphone;

Step 3: Finally, the user can perform further actions to store or discard the content obtained.

The dragging gesture is performed and tested on a smartphone for at least 100 times to prove that the expected response time $T_r$ can be achieved at the level around 1 second for a signage with N=5 using Wi-Fi.

Figure 13:
FIG. 13 shows the students with the smartphones who successfully dragged the intended content to their devices simultaneously.

In order to test the implementation of the smart signage system, 30 primary school students are invited to the laboratory to experiment with the system. Six smartphones installed with our designed client mobile application are distributed to these students. The smartphones are manufactured by different companies. With almost no learning curves for the students about the principle of the interaction modality, these 30 students have easily managed to get themselves familiar with the system after listening to only one minute's introduction of the concept of "dragging" the content from the signage display to their smartphones. FIG. 13 shows the students with the smartphones who successfully dragged the intended content to their devices simultaneously. This has actually proved that the smart signage system successfully provides an intuitive interactive modality that even primary school students can quickly learn to operate. This demonstration also proves that the smart signage system is scalable to enable future digital signage to subcutaneously interact with a large number of users.

Figure 14:
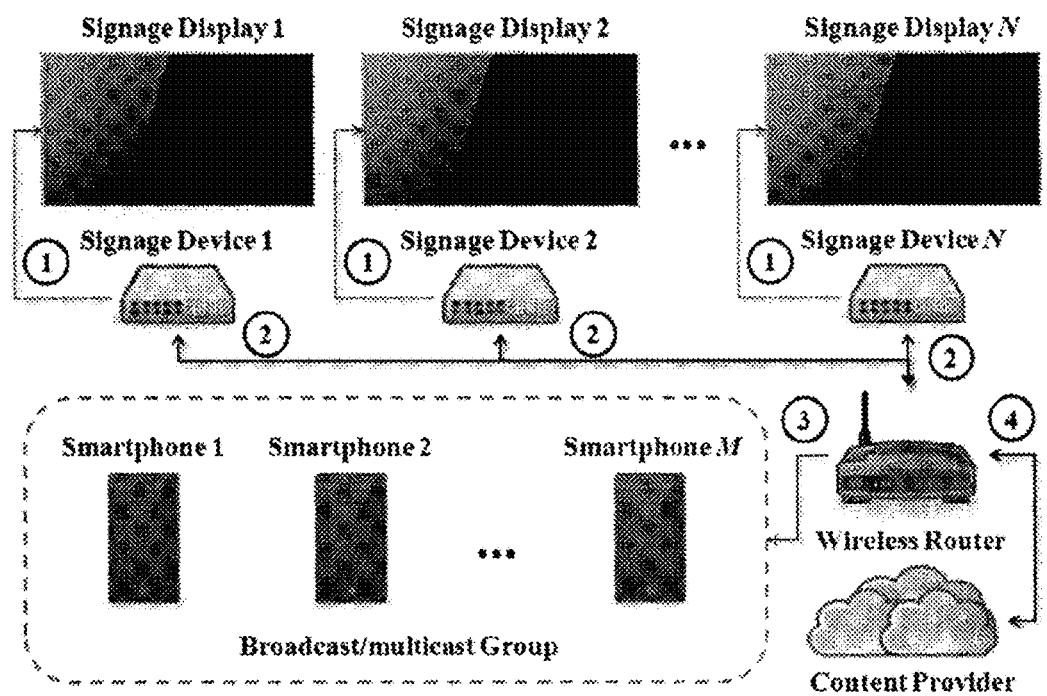
FIG. 14 illustrates the architecture of a smart signage system according to another embodiment of the present patent application.

FIG. 14 illustrates the architecture of a smart signage system according to another embodiment of the present patent application. Comparing to the embodiment illustrated in FIG. 1, in this embodiment, the system includes a plurality of (N) signage devices, each being connected with a signage display and in wireless communication with a plurality of (M) client devices (smartphones) through a wireless router.

Figure 15:
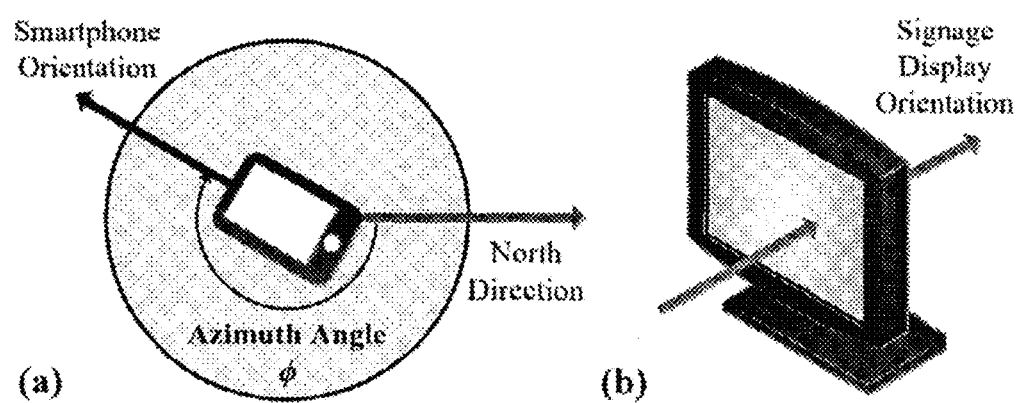
FIG. 15 illustrates the orientation of the smartphone and the orientation of the signage display.

The client device in this embodiment is a smartphone having an embedded orientation sensor, which measures the postures (or orientation) of the smartphone in 3D space. An orientation sensor can be constructed from an accelerometer and a magnetic sensor. The data measured by the accelerometer and magnetic sensor are processed to get the azimuth angle and inclination angle of the smartphone. In this embodiment, only the azimuth angle is utilized to quantify the orientation of the smartphone, which is illustrated in FIG. 15(a). Referring to FIG. 15(a), the disk represents the plane which is perpendicular to the direction of the Earth's gravity. The north direction is the direction of the Earth's magnetic north projected on the plane. The smartphone's orientation is the direction of the smartphone projected on the same plane. The smartphone's orientation is quantified by the azimuth angle $\Phi$ measured clockwise from the north direction to the smartphone's orientation. The azimuth angle of the user's smartphone $\Phi$ varies within $[0, 2\pi)$. The signage display's orientation, as shown in FIG. 15(b), is defined as the direction that is perpendicular to the signage display, and is pointing into the display surface. When a user is standing in front of the signage display and pointing his/her smartphone at the signage display, the smartphone orientation aligns with the signage display orientation, which also can be quantified by the same or similar azimuth angle measured by the smartphone, which is denoted as $\theta$. Assuming there are multiple signages at one location with different orientations, they can be differentiated by an array of different azimuth angles, $\{\theta_n | n=1, 2, \ldots N\}$, each of them representing a particular signage $S_n$, where n=1, 2, ..., N.

Figure 16:
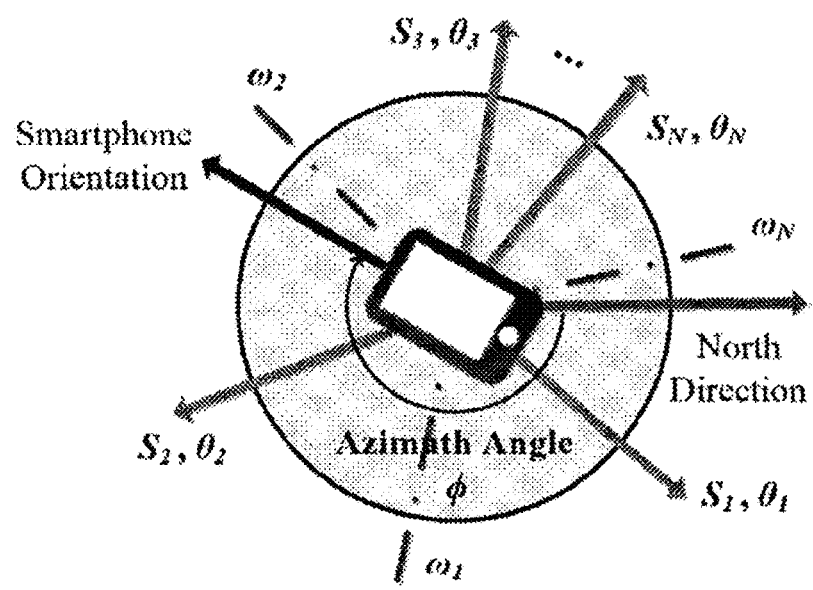
FIG. 16 illustrates the azimuth angle ranges of the signage displays.

When a user is walking around in the location with multiple signages, he/she is not necessary always standing in front of the signage display that the user is intended to interact with. So the smartphone's orientation is not always the same as the signage's orientation when the user is pointing the smartphone at the signage. To resolve this issue, as illustrated in FIG. 16, each signage $S_n$ is assigned with an azimuth angle range $[\omega_{n-1}, \omega_n)$ if n≥2 and $[\omega_N, \omega_1)$ if n=1, where $$\omega_n = \frac{1}{2}(\theta_n + \theta_{n+1})$$

if n<N and $$\omega_N = \frac{1}{2}(\theta_N + \theta_1 + 2\pi) - 2\pi \left\lfloor \frac{\frac{1}{2}(\theta_N + \theta_1 + 2\pi)}{2\pi} \right\rfloor.$$

With the adoption of azimuth angle ranges, as long as the smartphone's orientation is within the azimuth angle range of the intended signage display, the smartphone is configured to correctly choose the signage display that the user is pointing at to interact with.

In the above embodiments, multiple smart signage systems allow a large number of users to simultaneously interact with a selected signage display through a very intuitive "dragging" hand gesture using their smartphones. After the users "dragged" a content from a signage display, the same displayed content or associated information of that content will appear on their smartphones instantly, which can be stored in their smartphones for future actions such as purchasing or redemptions. The described protocol and system design are basically compatible to any signage displays and signage devices that utilize any local- or regional-area wireless technology like Wi-Fi to generate B/M signals for connecting the targeted group of user smart mobile devices. In the aspect of the client devices, the proposed system is also compatible to most smartphone systems today where an accelerometer is equipped and can be used for "dragging" gesture detection and radio capabilities like Wi-Fi to receive some radio B/M signal (e.g., IP multicast radio signals).

The smart signage systems described in the above embodiments provide means for the users to obtain information they are interested in from a digital display in advertising. Compared with conventional technologies used in interactive advertising such as QR code, pattern recognition, near-field communication (NFC) and Bluetooth, the smart signage systems provided by the embodiments have the advantages such as simultaneously interacting with a large number of users, interacting with the users with a more flexible distance, providing an intuitive interactive modality which can be operated simply by "dragging", less visual compromise on the presentation of the advertisement, higher throughput, and mobility support, as summarized in Table 2.

TABLE 2

Summary of advantages of the smart signage system

| | Technologies | | | | | |
|---|---|---|---|---|---|---|
| Metrics | Bluetooth | System-side camera | QR code | Device-side camera | NFC | Smart Signage |
| Simultaneous user interaction | x | x | x | x | x | ✓ |
| More flexible distance | x | x | ✓ | ✓ | x | ✓ |
| More intuitive interaction | x | ✓ | x | x | ✓ | ✓ |

TABLE 2-continued

Summary of advantages of the smart signage system

| Metrics | Technologies | | | | | |
|---|---|---|---|---|---|---|
| | Bluetooth | System-side camera | QR code | Device-side camera | NFC | Smart Signage |
| Less visual compromise | ✓ | x | x | ✓ | ✓ | ✓ |
| Higher throughput | x | x | x | x | x | ✓ |
| Mobility support | x | x | x | x | x | ✓ |

While the present patent application has been shown and described with particular references to a number of embodiments thereof, it should be noted that various other changes or modifications may be made without departing from the scope of the present invention.

What is claimed is:

1. A scalable, real-time interactive and content synchronized smart signage system comprising:
a signage device storing at least one display file, joining a broadcasting or multicasting group, and constantly and periodically broadcasting at least one draggable file in the broadcasting or multicasting group; each draggable file corresponding to one of the at least one display file;
a signage display being connected to the signage device and configured to display contents corresponding to the at least one display file; and
a plurality of client devices being in wireless communication with the signage device;
wherein:
the signage device is configured to broadcast a plurality of packets in the broadcasting or multicasting group; each of the plurality of packets comprising a display ID for indicating the content of which display file being currently displayed on the signage display, and a data fragment of one of the at least one draggable file;
each client device is configured to join the broadcasting or multicasting group, receive and locally buffer the plurality of packets, and recognize a gesture from a user;
once the gesture is recognized at a client device, the client device is configured to inspect the display ID included in the packet received at the time instant, identify if a complete draggable file corresponding to the display file having the content indicated by the display ID is in the buffer, open the complete draggable file and display the content of the complete draggable file; otherwise, the client device is configured to continue receiving data fragments of the draggable file corresponding to the display file having the content indicated by the display ID until all the data fragments of the draggable file are successfully received;
wherein the client device is configured to remove a buffered file without any explicit instruction if the content associated with the buffered file is not selected by the user with the gesture and the client device has been placed out of an interaction range for a predetermined time period.

2. The smart signage system of claim 1, wherein the signage device is configured to broadcast the plurality of packets to the client devices in the broadcasting or multicasting group through a predetermined broadcast/multicast scheduling policy.

3. The smart signage system of claim 1, wherein each draggable file is divided into a plurality of data fragments each being indexed by an index to indicate a sequence for the client device.

4. The smart signage system of claim 1 further comprising a wireless access point being wirelessly connected with the signage device and the client devices, wherein the client devices are in wireless communication with the signage device through the wireless access point, and the wireless access point is built in the signage device or the signage display.

5. The smart signage system of claim 1, wherein the signage device is configured to check content change from a content provider and update the contents stored in the signage device accordingly.

6. The smart signage system of claim 1, wherein the content of each draggable file is allowed to be different from the content of the corresponding display file.

7. The smart signage system of claim 1, wherein the size of each draggable file is allowed to be smaller in size than the corresponding display file.

8. The smart signage system of claim 1, wherein the gesture is a dragging action, and each client device comprises a tri-axis accelerometer and is configured to detect the dragging action by checking the reading ranges of the tri-axis accelerometer when the total acceleration of the client device reaches a maximum.

9. The smart signage system of claim 1, wherein the signage device and the client device are configured to join the broadcasting or multicasting group asynchronously.

10. A method for real-time interacting and synchronizing content over a scalable communication between a signage device and at least one client device, the signage device storing at least one display file, the method comprising:
constantly and periodically broadcasting, by the signage device, a plurality of packets in a broadcasting or multicasting group; each of the plurality of packets comprising a display ID and a data fragment of one of at least one draggable file; the display ID indicating the content of which display file being currently displayed on a signage display which is connected to the signage device and configured to display contents corresponding to the at least one display file; each draggable file corresponding to one of the at least one display file;
when a client device joins the broadcasting or multicasting group, receiving and locally buffering, by the client device, the plurality of packets, and recognizing a gesture from a user;
once the gesture is recognized, inspecting, by the client device, the display ID included in the packet received at the time instant, identifying if a complete draggable file corresponding to the display file having the content indicated by the display ID is in the buffer, opening the complete draggable file and displaying the content of the complete draggable file; otherwise, continuing to receive data fragments of the draggable file corresponding to the display file having the content indicated by the display ID until all the data fragments of the draggable file are successfully received; and removing, by the client device, a buffered file without any explicit instruction if the content associated with the buffered file is not selected by the user with the gesture and the client device has been placed out of an interaction range for a predetermined time period.

\* \* \* \* \*